Figure 1:
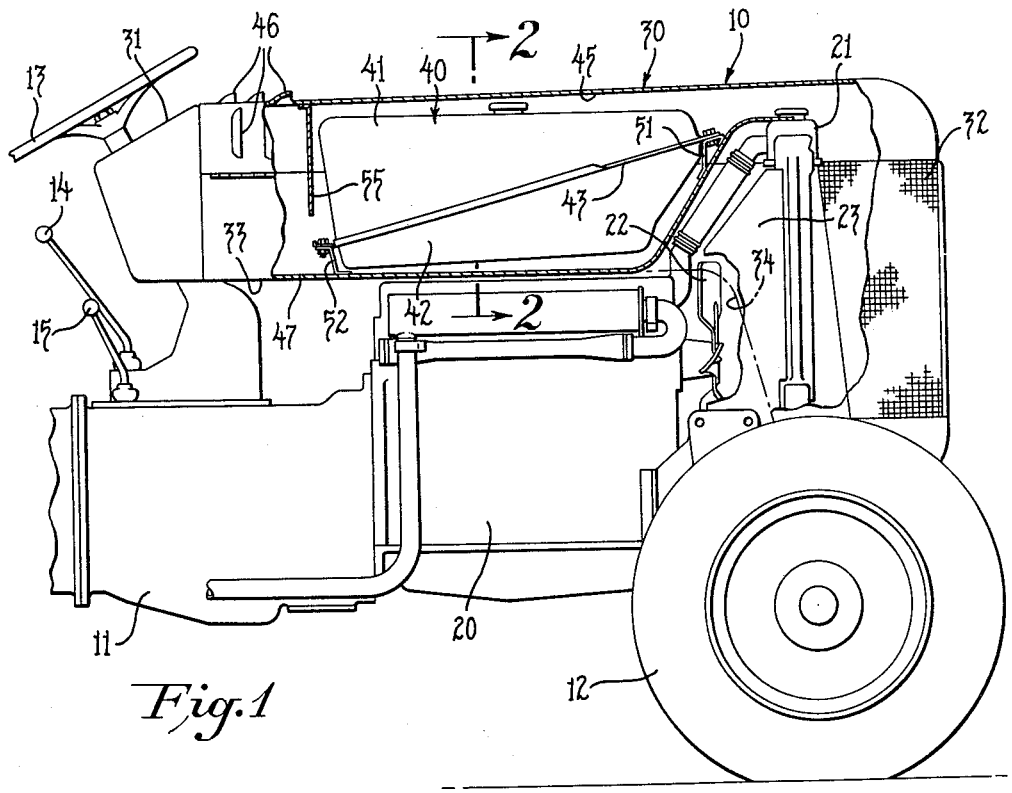

Dec. 11, 1962   H. G. KLEMM   3,067,829
FUEL TANK MOUNTING
Filed June 27, 1961

INVENTOR.
HERMAN G. KLEMM
BY
Wolfe, Hubbard, Voit & Osann
ATTORNEYS.

United States Patent Office 3,067,829
Patented Dec. 11, 1962

3,067,829
FUEL TANK MOUNTING
Herman G. Klemm, Birmingham, Mich., assignor to Massey-Ferguson Inc., Detroit, Mich., a corporation of Maryland
Filed June 27, 1961, Ser. No. 120,884
10 Claims. (Cl. 180—1)

The present invention relates generally to internal combustion power plants and concerns more particularly a fuel tank mounting for such power plants.

This application is a continuation-in-part of my copending application Serial No. 51,596, filed August 24, 1960, now abandoned.

Agricultural tractors are normally powered by internal combustion engines which burn relatively volatile and combustible fuels. As tractor design has evolved, it has become common to locate the fuel tank above the engine at the forward end of the tractor, and often the tank is disposed within the same housing that encloses the engine and its associated assemblies. Engine heat thus tends to directly affect the temperature of the fuel tank and its contents, and since such vehicles are often called upon to operate long hours under heavy loads and in extremely hot weather environments, the control of fuel tank temperature is a critical problem.

Hot combustible fuel is, of course, potentially dangerous and the increased volatility of fuel at higher temperatures materially increases the loss of fuel by evaporation from a tank.

Similar arrangements of engine, housing and fuel tank have also become common for power plants intended for stationary use or with mobile equipment other than tractors. It will be evident that temperature problems similar to those discussed above also exist in such installations.

Accordingly, it is the primary aim of the invention to provide a novel fuel tank mounting and air intake arrangement for a power plant which controls fuel tank temperature without disturbing the desirable design relationship of disposing the fuel tank up above the engine.

Moreover, it is an object of the invention to provide a novel radiator air intake mounting and fuel tank mounting which prevents heat buildup and cools the tank and its contents both for safety and for minimizing fuel evaporation losses. It is also an important object to provide a fuel tank mounting as characterized above that is quite economical and can be easily embodied in conventional power plant designs.

Figure 2:
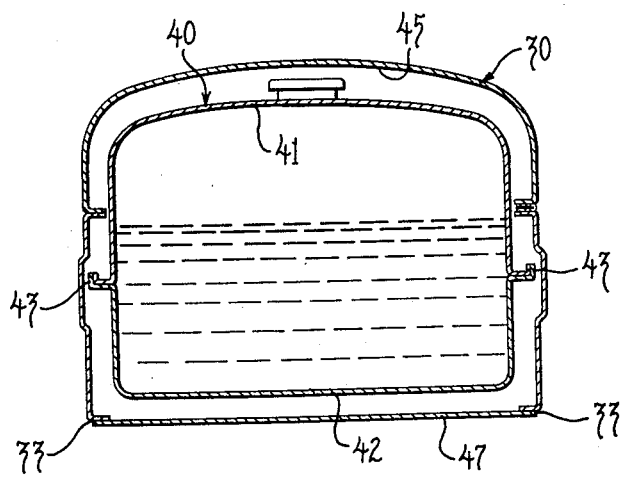

Other objects and advantages of the invention will become apparent upon reading the following detailed description and upon reference to the drawing in which:

FIGURE 1 is a fragmentary sectional view of a tractor in which the present invention is embodied; and FIG. 2 is a fragmentary enlarged section taken approximately along the line 2—2 of FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is shown the forward portion of a tractor 10 embodying the invention and having a main frame 11 supported on front steerable wheels 12 and operated by controls including a steering wheel 13 and transmission control levers 14 and 15. The tractor 10 is powered by an internal combustion engine 20 which includes a conventional cooling radiator 21 through which air is drawn by a fan 22 that is driven from the engine. The radiator 21 is set somewhat above the engine 20 and a funnel-like hood 23 is provided to keep the fan 22 and the radiator in airflow communication.

Overlying the engine 20 and the related elements making up the tractor power plant is a hood housing 30 which extends forwardly of the radiator 21 from an instrument panel 31 adjacent the steering wheel 13. A radiator screen 32 is fitted in the housing 30 to supply cooling air to the radiator 21. The rear portion of the hood housing 30 extends downwardly on either side of the tractor to a line 33 that is just above the engine 20 and the forward portion of the hood housing slopes down along a dashed line 34 so as to surround both sides of the radiator 21.

Fuel for the engine 20 is carried in a fuel tank 40 disposed within the hood housing 30 above the engine 20. The tank 40 is formed conventionally of upper and lower portions 41 and 42, respectively, joined along a flange 43.

In accordance with the invention, the hood housing 30 includes a tubular portion 45 within which the fuel tank 40 is mounted so as to define an airflow passage between the tank and the tubular portion of the housing. One end of the airflow passage opens to the region between the screen 32 and the radiator 21 through which air is drawn to the radiator, and the other end of the passage is open to air intake ducts 46 formed in the housing.

As a result of this construction, the movement of air through the screen 32 and the radiator 21 caused by the fan 22 creates an aspiratory effect that draws relatively cool outside air in through the ducts 46 and along the airflow passage adjacent the tank 40. The aspiratory effect results from a slight air pressure drop in the region between the screen 32 and the radiator 21 which is caused by the inherent drop in gas pressure accompanying an increase in gas velocity and by the fact that the screen 32 is slightly restrictive of free airflow so that the fan 22 draws air in through the ducts 46 as well as the screen 32. In other words, the restriction of the screen 32 to free airflow is slightly greater than the capacity of the fan 22 to move air. Thus, the fan pulls in air through the tubular portion 45 of the hood 30 as well as through the screen 32.

It is important to appreciate that the pressure drop causing the aspiratory effect and the resulting airflow past the tank 40 are of a very low order of magnitude. It is sufficient for accomplishing the purposes of the invention to simply avoid having stagnant air adjacent the tank 40 since the tank itself does not generate heat. The insulating qualities of air are well-known and by maintaining a drifting airflow in the passage surrounding the tank, these insulating qualities are maintained without building up the temperature of the air itself.

Forming the tubular portion 45 is an inner floor 47 extending between and secured to the opposite sides of the hood housing 30 (see FIG. 2). The floor 47 runs from the top of the radiator 21 to the rear of the housing 30 (see FIG. 1). The fuel tank 40 is mounted in spaced relation to the surrounding tubular portion of the hood housing by front and rear brackets 51 and 52 which are fixed to the floor 47 and bolted to the flange 43 of the fuel tank.

To insure that air from the ducts 46 flows past the lower portion of the tank 40, a baffle 55 is disposed between the ducts and the tank so as to deflect the air downwardly. In the illustrated embodiment, the fuel tank 40 is spaced from all sides of the surrounding hood housing so that an airflow passage is provided on the top, bottom and both sides of the fuel tank. The top and side spaces tend to isolate the fuel tank from environmental temperatures as caused by the hot summer sun, while the bottom spacing insulates the tank from the heat of the underlying engine 20.

If desired, a metallic foil may be adhered to the outer surface of the lower fuel tank portion 42 so as to provide a highly reflective surface. This minimizes absorption of radiated heat by the tank 40 and also provides a smooth surface which resists accumulating dirt and dust. It will be appreciated that such a heat reflective surface would be well protected from oil or corrosive fumes thrown off by the engine 20 and hence would remain effective throughout a long operating life.

Preferably, the air intake ducts are positioned out of the region of flying foreign material kicked up by the tractor. In the illustrated construction, the ducts 46 are formed at the top center of the tractor where little flying trash and dust is encountered. Thus, little if any foreign material is drawn into the tubular housing portion 45. However, it will be clear that the air intake opening for the tubular portion 45 can be located at any convenient point. For example, a front air intake above the screen 32 can supply air to a serpentine air passage formed about the tank 40.

Those familiar with the art will appreciate that the novel fuel tank mounting illustrated and described can be easily incorporated in existing tractor designs with little change and without great expense. The reduction in fuel tank temperatures resulting from the practice of the invention has been found to appreciably decrease tractor fuel consumption by minimizing evaporation losses.

It will also be clear that the invention can be advantageously embodied in any internal combustion engine power plant whether mounted in a tractor or not.

I claim as my invention:

1. For use with a power plant which includes a radiator through which air is drawn, the combination comprising a hood housing including a tubular portion disposed above said power plant, a fuel tank centrally mounted within said tubular portion in spaced relation to the sides thereof so as to provide airflow passages between said tank and the surrounding hood housing, one end of said tubular portion being open to the region through which air is drawn to the radiator, and the other end of said tubular portion having an air intake duct so that the flow of air toward said radiator creates an aspiratory effect drawing air in through said duct and about said tank so as to insulate and cool the latter.

2. For use with a power plant which includes a radiator through which air is drawn, the combination comprising a hood housing including a tubular portion disposed above said power plant, a fuel tank centrally mounted within said tubular portion in spaced relation to the sides thereof so as to provide airflow passages between said tank and the surrounding hood housing, one end of said tubular portion being open to the region through which air is drawn to the radiator, the other end of said tubular portion having an air intake duct so that the flow of air toward said radiator creates an aspiratory effect drawing air in through said duct and about said tank so as to insulate and cool the latter and a baffle disposed between said air intake duct and said tank for deflecting air from the duct around the tank.

3. In a tractor having a power plant which includes a radiator through which air is drawn, the combination comprising a hood housing including a tubular portion disposed above said power plant, a fuel tank mounted within said tubular portion in spaced relation to the sides thereof so as to provide airflow passages between said tank and the surrounding hood housing, one end of said tubular portion being open to the region through which air is drawn to the radiator, and the other end of said tubular portion having a plurality of intake ducts so that the flow of air toward said radiator creates an aspiratory effect drawing air in through said ducts and about said tank so as to insulate and cool the latter, said air intake ducts being disposed at the top center of the tractor out of the region of flying foreign material kicked up the tractor.

4. For use with a power plant including a radiator at one end of the plant through which air is drawn, the combination comprising an outer hood overlying said power plant, an inner floor extending from side to side of said hood from the top of said radiator toward the other end of said hood, a fuel tank mounted between and in spaced relation to said hood and said floor, and said hood having an air intake duct positioned at the rear of said tank so that the flow of air toward said radiator creates an aspiratory effect drawing air in through said duct and forward about said tank so as to insulate and cool the latter.

5. For use with a power plant including a radiator at one end of the plant through which air is drawn, the combination comprising an outer hood overlying said power plant, an inner floor extending from side to side of said hood from the top of said radiator toward the other end of said hood, a fuel tank mounted between and in spaced relation to said hood and said floor, said hood having an air intake duct positioned at the rear of said tank so that the flow of air toward said radiator creates an aspiratory effect drawing air in through said duct and forward about said tank so as to insulate and cool the latter, and a baffle disposed between said air intake duct and the rear of said tank for deflecting air from the duct to the lower portion of the tank.

6. In a tractor having a power plant that includes a radiator through which air is drawn, the combination comprising a hood housing including a tubular portion disposed above said power plant, means defining a fuel tank within said tubular portion, said tank being spaced from the underlying section of said housing tubular portion so as to provide an airflow passage between the tank and said section which adjoins said power plant, one end of said tubular portion being open to the region through which air is drawn to the radiator, and the other end of said tubular portion having an air intake duct so that the flow of air toward said radiator creates an aspiratory effect drawing air in through said duct and about said tank so as to insulate and cool the latter, said air intake duct being disposed out of the region of flying foreign material kicked up by the tractor.

7. In a power plant which includes a radiator through which air is drawn, the combination comprising a hood housing enclosing said radiator and including a tubular portion disposed above said power plant, a fuel tank mounted within said tubular portion so as to leave an airflow passage between said tank and the tubular portion of said housing, a screen in said housing for supplying air to said radiator, one end of said airflow passage being open to the region between said screen and said radiator through which air is drawn to the tractor, the other end of said passage having an air intake duct, said screen being slightly restrictive of free airflow so that air is drawn through said radiator from said passage air intake duct as well as said screen.

8. In a power plant including a radiator at one end of the plant through which air is drawn, the combination comprising an outer hood overlying said power plant and surrounding said radiator, an inner floor extending from side to side of said hood from the top of said radiator toward the other end of said hood, a fuel tank mounted within said hood and above said floor so as to define an airflow passage between said tank and said floor, a screen in said hood for supplying air to said radiator, one end of said passage being open to the region between said screen and said radiator through which air is drawn to the radiator, the other end of said passage having an air intake duct, said screen being slightly restrictive of free airflow so that air is drawn through said radiator from said passage air intake duct as well as said screen.

9. In a power plant which includes a radiator through which air is drawn, the combination comprising a fuel tank mounted above said power plant, means defining an airflow passage between said tank and said power plant, a housing surrounding the air receiving side of the radiator, a screen in said housing for supplying air to said radiator, one end of said airflow passage being open to the region between said screen and said radiator through which air is drawn to the tractor, the other end of said passage having an air intake duct so that air is drawn through said radiator from said passage air intake duct as well as said screen.

10. In a power plant including a radiator through which air is drawn and a screen spaced from the air receiving side of the radiator, the combination comprising a floor extending from the top of said radiator above said power plant, a fuel tank mounted above said floor so as to define an airflow passage between said tank and said floor, one end of said passage being open to the region between said screen and said radiator through which air is drawn to the radiator, the other end of said passage having an air intake duct so that air is drawn through said radiator from said passage air intake duct as well as said screen.

References Cited in the file of this patent

UNITED STATES PATENTS

| | | |
|---|---|---|
| 1,254,861 | Smeeth | Jan. 29, 1918 |
| 1,419,896 | Page | June 13, 1922 |
| 1,887,724 | Sieweck | Nov. 15, 1932 |
| 1,970,724 | Arnold | Aug. 21, 1934 |
| 2,123,991 | Fageol | July 19, 1938 |

FOREIGN PATENTS

| | | |
|---|---|---|
| 899,909 | Germany | Dec. 17, 1953 |